Patented June 29, 1943

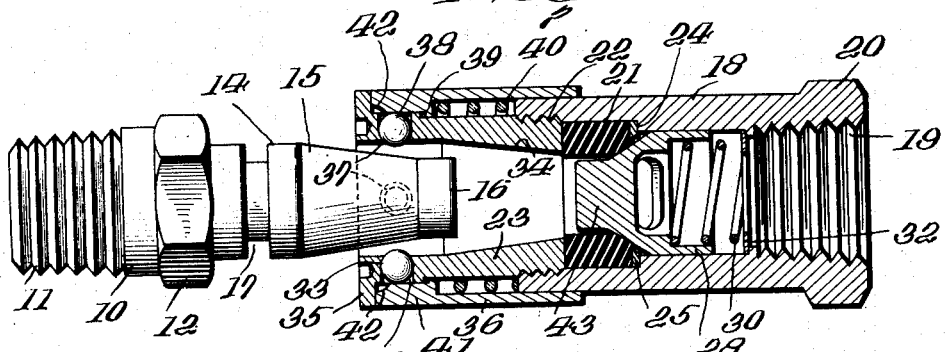
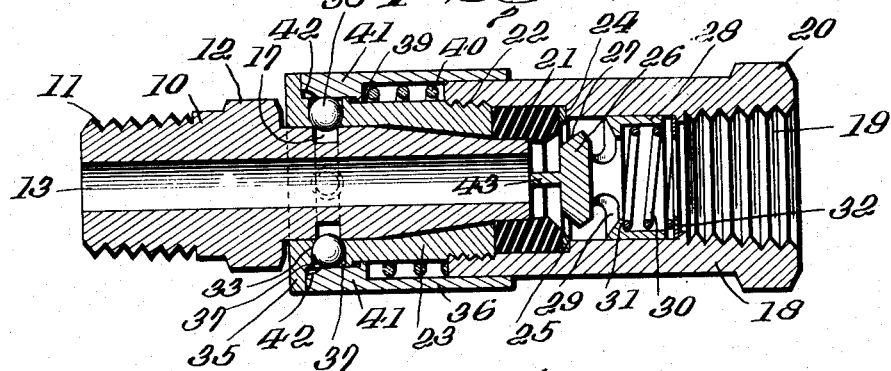
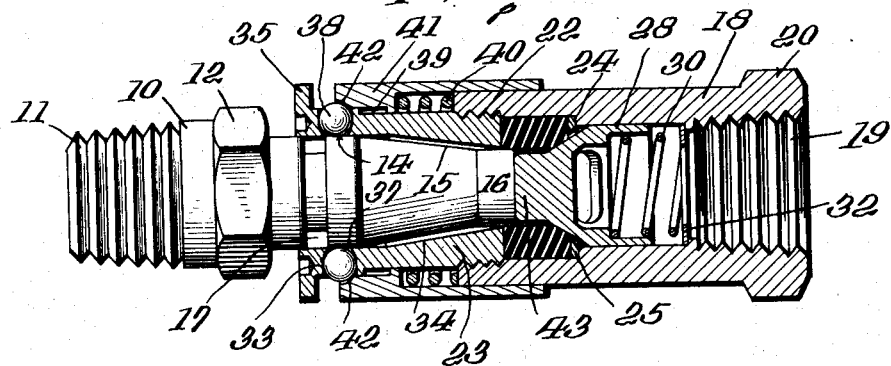

2,322,877

UNITED STATES PATENT OFFICE 2,322,877

COUPLING

Arthur L. Parker, Cleveland, Ohio

Application January 11, 1941, Serial No. 374,118

4 Claims. (Cl. 284—19)

The present invention relates to new and useful improvements in couplings, and more particularly to improvements in a valved coupling which may be used for conveniently and rapidly attaching and detaching sections or extensions of a fluid pressure system.

In various fluid distributing systems, it is often necessary to attach conduit extensions to fixed supply outlets or to add conduit sections to said extensions. In oxygen, air, or other fluid systems, it is desirable to be able to quickly attach or detach sections or extensions of a hose or other conduit in order to facilitate the distribution of the fluid to desired locations. In such fluid systems, it is customary to employ couplings which include a pair of coupling members adapted to be readily attached or detached. In order to prevent leakage of fluid during the attaching or detaching of the coupling members, at least one of the coupling members is provided with a valve which is automatically operable to close the conduit when the coupling members are separated and which is automatically operable to open the conduit when the coupling members are connected.

An object of the present invention is to provide a coupling of the above type which is constructed and arranged so that a relatively small movement of the valve member is necessary in order to open the fluid line in such a manner that the passage of fluid through the coupling is not materially restricted.

A further object of the invention is to provide a coupling of the above type wherein the valve member is accurately guided during opening and closing movements and wherein the valve member is constructed so that the flow of fluid through the coupling is not materially restricted when the valve is open.

The above and other objects of the invention will in part be obvious and will hereinafter be more fully pointed out.

In the accompanying drawing:

Figure 1 is a side view with one of the coupling members in section, showing the coupling members when separated.

Figure 2 is a longitudinal section showing both coupling members connected.

Figure 3 is a view, similar to Figure 1, but showing the male coupling member partially inserted into the female coupling member before the locking means is effective to lock the parts together.

Referring more in detail to the accompanying drawing, the coupling includes detachable coupling members in the form of male and female sections. The male coupling member 10 includes an externally threaded end portion 11 which may be secured to any suitable conduit. There is also provided a wrench engaging portion 12 by which the male coupling member may be tightly secured to the conduit. A longitudinal passage 13 extends through the male coupling member and the opposite end thereof is in the form of a nipple which is provided with a cylindrical portion 14, a tapered portion 15 and a reduced cylindrical end portion 16. The cylindrical portion 14 is provided with an annular groove 17 which is for the purpose of receiving locking elements in a manner to be hereinafter more fully pointed out.

The female coupling member includes a body portion 18 which has one end thereof internally threaded, as at 19, to receive a fluid conduit or to be attached to a fixed supply outlet. A wrench engaging portion 20 is provided around this end of the body portion 18 in order to facilitate the securing thereof to a conduit. The body portion 18 is in the form of a sleeve, the inner surface of which is offset, as at 21, to provide an annular shoulder facing toward the opposite end of the body portion. The opposite end of the sleeve is provided with an internally threaded portion 22 which is adapted to receive an externally threaded portion on an extension sleeve 23. The inner end of the sleeve 23 provides a shoulder which is opposed to the shoulder 21 on the body portion 18. A suitable form of packing 24 is tightly clamped between the end of the sleeve 23 and an annular retaining washer 25 which is seated on the shoulder 21.

A valve member 26 is provided with an inclined peripheral valve surface 27 which is adapted to cooperate with a similarly inclined surface on the washer 24 so as to seal the conduit when the parts are in the position shown in Figure 1. The valve member is provided with a rearwardly extending skirt portion 28 which snugly fits within the body portion 18 so that the valve member is guided in its opening and closing movements. Passages 29 are formed between the valve member 26 and the skirt portion 28 thereof so as to afford a substantially free passage for fluid around the valve member when in an open position. A spring 30 bears on an inward shoulder 31 at one end of the skirt 28 and at the opposite end against an annular retaining washer 32 so that the spring tends to normally force the valve member 26 to a closed position.

The inner surface of the sleeve extension 23 is provided with a cylindrical end portion 33 substantially corresponding to the cylindrical portion 14 on the male coupling member and with a tapered portion 34 which substantially coincides with the tapered portion 15 on the male coupling member. The outer end of the sleeve extension 23 is provided with an outwardly extending flange portion 35 which serves as a stop for a locking sleeve 36 surrounding the adjacent end of the female coupling member. Within the flanged end of the sleeve extension 23, are provided a plurality of spaced radially extending openings 37 therethrough. Locking elements in the form of balls 38 are disposed in the openings 37, the inner edges of which are spun inwardly to prevent the locking balls from falling inwardly from the openings. The locking sleeve 36 is provided with an inwardly extending shoulder portion 39 which opposes the end of the body portion 18 and defines a recess within which a coil spring 40 is disposed. The coil spring tends to force the locking sleeve 36 toward the position shown in Figures 1 and 2. The outer end 41 of the sleeve 36 engages and is adapted to slide along the outer surface of the cylindrical end of the sleeve extension 23 and the opposite end of the sleeve 36 overlies and engages the outer surface of the body portion 18.

The edge of the inner surface of the end 41 of the sleeve 36 is provided with an arcuate peripheral recess 42 which permits the locking balls 38 to move outwardly to the position shown in Figure 3. In this position of the coupling, the nipple on the male coupling member may be inserted within the female coupling member and the balls permit the cylindrical portion 14 to pass therebetween. When the groove 17 on the male coupling member lies within the openings 37, as shown in Figure 2, the spring 40 will urge the sleeve 36 into abutting relationship with the flange 35 so that the inner surface of the end 41 of the sleeve 36 will maintain a portion of the surface of the balls 38 in engagement with the groove 17. When the sleeve 36 is in this position, the balls are prevented from being urged outwardly so that the male coupling member is securely locked within the female coupling member. In order to release the coupling, the sleeve 36 is shifted toward the body portion 18 so as to bring the arcuate recess 42 to the position shown in Figure 3 so that the balls 38 may be shifted out of engagement with the edges of the groove 17. In this position, the male coupling member may be withdrawn from the female coupling member. When the coupling members are separated, the spring 30 will urge the valve member 26 with its valve surface 27 into engagement with the annular sealing washer 24, as shown in Figure 1, so that the female coupling member is sealed to prevent leakage of fluid therefrom.

In attaching the coupling members, the sleeve 36 is shifted inwardly substantially to the position shown in Figure 3 so that the tapered portion 15 will initially engage the exposed surfaces of the balls 38 and force the same outwardly toward the arcuate recess 42. The cylindrical portion 14 on the nipple will cause the outward forcing of the balls 38 and the sleeve can then be released. Further movement of the male member relative to the female member will bring the groove 17 into alignment with the balls 38 and the spring 40 will then force the sleeve 36 outwardly so that the balls 38 will be snapped into and maintained in engagement with the edges of the groove 17, as shown in Figure 2. Thus, the balls 38 are prevented from being outwardly forced so that the coupling members are securely locked relative to one another.

During inward movement of the male member, it is to be noted that the cylindrical end 16 engages the inner surface of the annular sealing washer 24 before the valve member 26 is shifted away from its seat so that a seal is effected prior to opening of the valve. The valve member 26 is provided with a relatively narrow transversely extending rib 43 which extends within the opening through the annular sealing washer 24. This rib 43 is dimensioned so that it will be engaged by the cylindrical end 16 of the nipple during inward movement of the male coupling member. After the initial seal is provided between the washer and the cylindrical end 16, further inward movement of the male coupling member will force the valve member 26 inwardly to the position shown in Figure 2. In this position, the coupling members will be locked relative to one another and the valve surface 27 will be shifted away from its seat so that fluid can pass around the valve member and through the connected coupling. Similarly, during separation of the coupling members, the valve member will be seated before the seal is broken between the cylindrical end 16 and the washer 24.

The passages 29 through the valve member are diametrically opposed to one another and positioned so that the fluid passing through the coupling is directed to opposite sides of the rib 43 in passing around the valve member. With this construction, the rib 43 does not afford any substantial obstruction to the free flow of fluid. These passages are relatively large so as to accommodate, without substantial interference or eddy currents, the full volume of fluid passing through the connected coupling. The valve sleeve 28 is disposed peripherally around the inner surface of the body portion 18 so that it does not materially interfere with the passage of fluid. During opening and closing movements of the valve according to relative movements between the coupling members, it will be seen that a relatively small movement of the valve member is necessary in order to open or close communication between the coupling parts.

While one form of the invention has been shown for purposes of illustration, it is to be clearly understood that various changes in the details of construction and arrangement of parts may be made without departing from the scope of the invention as set forth in the appended claims.

I claim:

1. A coupling for joining fluid conduits and comprising a female coupling member, an annular elongated sealing washer substantially fixed against longitudinal deformation in the female coupling member and providing a tapered valve seat at one end thereof, a valve member mounted in the female coupling member and having a tapered seating surface adapted to engage the valve seat for sealing the female coupling member with limited radial deformation thereof, spring means for normally forcing said valve member toward a seated position, a male coupling member having a nipple portion adapted to be inserted in said female coupling member, said valve member having a relatively narrow transverse rib extending within the sealing washer and terminating short of the opposite end thereof whereby to permit the nipple portion on the male coupling member to initially engage the inner surface of the washer to seal the connection and said nipple being adapted upon further inward movement to engage the transverse rib and shift the valve member and seating surface away from the valve seat to permit fluid communication between the coupling members.

2. A coupling for joining fluid conduits and comprising a female coupling member, an annular sealing washer disposed in said female coupling member and providing a valve seat at one end thereof, a valve member guided in said female coupling member and having a seating surface adapted to engage the valve seat for sealing the female coupling member, a male coupling member having a nipple portion insertable in said female coupling member and adapted to initially engage the inner surface of the washer for sealing the connection and being adapted upon further inward movement to engage the valve member for shifting the seating surface away from the valve seat, said nipple portion having an outer peripheral groove adjacent the outer end thereof, a sleeve mounted exteriorly of said female coupling and a spring means for normally urging the sleeve toward the free end of said female coupling, said female coupling member having an outwardly directed flange at the free end thereof serving to limit movement of the said sleeve, and locking elements carried by the female coupling member and engageable in said groove and said sleeve serving to maintain the locking elements in engagement with the groove to lock the coupling members together and being shiftable away from the free end of the female coupling member to permit outward movement of the locking elements upon withdrawal of the male coupling member from the female coupling member.

3. A coupling for joining fluid conduits comprising a female coupling member, an annular sealing washer disposed in said female coupling member and providing a valve seat at one end thereof, a valve member guided in said female coupling member and having a seating surface adapted to engage the valve seat for sealing the female coupling member when the coupling members are separated, a male coupling member having a nipple portion insertable in said female coupling member and adapted to engage the inner surface of the washer for sealing the connection and adapted for engagement with the valve member for shifting the same away from the valve seat when the coupling members are connected, said male coupling member having an outer peripheral groove therein, said female coupling member having openings therethrough adapted to register with the groove when the coupling members are assembled, locking elements mounted in said openings and adapted to engage within said groove for securing said coupling members in assembled position, a locking sleeve mounted on said female member adapted to engage the locking elements for holding the same in locking position and adapted when shifted endwise to release said locking elements so as to permit said coupling members to be separated.

4. A coupling for joining fluid conduits comprising a female coupling member, an annular sealing washer disposed in said female coupling member and providing a valve seat at one end thereof, a valve member guided in said female coupling member and having a seating surface adapted to engage the valve seat for sealing the female coupling member when the coupling members are separated, a male coupling member having a nipple portion insertable in said female coupling member and adapted to engage the inner surface of the washer for sealing the connection and adapted for engagement with the valve member for shifting the same away from the valve seat when the coupling members are connected, said male coupling member having an outer peripheral groove therein, said female coupling member having openings therethrough adapted to register with the groove when the coupling members are assembled, locking balls mounted in said openings and adapted to engage within the groove for securing said coupling members in assembled position, a sleeve mounted on said female member for endwise movement so as to cover said balls and hold them in locking position, a spring for moving the sleeve over the balls and a flange on said female member for limiting the endwise movement of the sleeve.

ARTHUR L. PARKER.